United States Patent [19]

Nowack et al.

[11] Patent Number: 4,992,620

[45] Date of Patent: Feb. 12, 1991

[54] REMOVAL OF TRIALKYL ARSINES FROM FLUIDS

[75] Inventors: Gerhard P. Nowack; Marvin M. Johnson; Joseph B. Cross; Patricia A. Tooley; Ted H. Cymbaluk, all of Bartlesville, Okla.

[73] Assignee: Phillips Petroleum Company, Bartlesville, Okla.

[21] Appl. No.: 439,745

[22] Filed: Nov. 21, 1989

[51] Int. Cl.$^5$ .......................... C07C 7/12; B01D 53/02
[52] U.S. Cl. .................................... 585/823; 585/820; 585/826; 423/210; 423/245.1; 502/22; 502/27
[58] Field of Search ....................... 585/823, 820, 826; 423/210, 245.1; 502/22, 27

[56] References Cited

U.S. PATENT DOCUMENTS

| | | | |
|---|---|---|---|
| 4,048,387 | 9/1977 | Lahme et al. | 429/50 |
| 4,532,115 | 7/1985 | Nishino et al. | 423/210 |
| 4,535,072 | 8/1985 | Kitayama et al. | 423/210 |
| 4,578,256 | 3/1986 | Nishino et al. | 423/210 |
| 4,593,148 | 6/1986 | Johnson et al. | 585/823 |
| 4,605,812 | 8/1986 | Nowack et al. | 585/845 |
| 4,839,029 | 6/1989 | Ichikawa et al. | 208/251 R |

FOREIGN PATENT DOCUMENTS 68034  4/1985  Japan ................... 423/210

OTHER PUBLICATIONS

"Comprehensive Inorganic Chemistry", by J. C. Bailar et al., vol. 2, Pergamon Press, 1973, p. 626.

*Primary Examiner*—Chung K. Pak
*Attorney, Agent, or Firm*—K. K. Brandes

[57] ABSTRACT

Trialkyl arsines are removed from fluids, in particular gases, by contacting with a solid sorbent material containing at least one manganese oxide (preferably $MnO_2$) and at least one Group IB metal oxide (preferably CuO). In a preferred feature, the used solid sorbent material is regenerated by oxidizing treatment, washing with an aqueous liquid, and drying.

20 Claims, No Drawings

REMOVAL OF TRIALKYL ARSINES FROM FLUIDS

BACKGROUND OF THE INVENTION

This invention relates to the removal of trialkyl arsines from fluids by means of solid sorbents. In another aspect, this invention relates to the removal of trialkyl arsines from gases, in particular hydrocarbon-containing gases.

Materials for adsorbing and/or absorbing unsubstituted arsine ($AsH_3$) are well known. However, many of these materials are ineffective for the sorption of trialkyl arsines, which may be present as undesirable impurities in natural gas streams produced at some well sites. This invention provides sorbent materials which are quite effective in removing trialkyl arsines from fluids, in particular gases, by sorption (i.e., adsorption and/or absorption).

SUMMARY OF THE INVENTION

It is an object of this invention to provide a process for removing trialkyl arsines from fluids. It is another object of this invention to provide a process for removing trialkyl arsines from gases, in particular hydrocarbon-containing gases. Other objects will become apparent from the detailed description of the invention and the appended claims.

In accordance with this invention, a process for at least partially removing trialkyl arsines from a fluid (preferably a gas) comprises the step of contacting a fluid feed which contains at least one trialkyl arsine with a solid sorbent material comprising (preferably consisting essentially of) (a) at least one manganese oxide and (b) at least one oxide of at least one metal of Group IB of the Periodic Table (as defined on page 852 of Webster New Collegiate Dictionary, 1977); wherein said contacting is carried out at such contacting conditions as to obtain a fluid product having a lower trialkyl arsine content than said feed, and to obtain a used sorbent material containing that portion of said at least one trialkyl arsine which has been removed from the feed. Preferably, the sorbent material is a Hopcalite comprising $MnO_2$ and CuO.

DETAILED DESCRIPTION OF THE INVENTION

The term "trialkyl arsine", as used herein, refers to compounds having the general chemical formula of $R_3As$, wherein each R is a radical independently selected from among alkyl groups (straight and/or branched), having 1-6 (more preferably 1-3) carbon atoms per molecule. Particularly preferred trialkyl arsines are trimethyl arsine, triethyl arsine and dimethyl ethyl arsine and diethyl methyl arsine.

Any suitable liquid or gaseous fluid stream which contains trialkyl arsine(s) can be used as feed in the process of this invention. Preferably, the feed is gaseous. Non-limiting examples of suitable gaseous feeds are: natural gas; gaseous petroleum fractions comprising paraffins and olefins containing 1-6 carbon atoms per molecule; and gaseous products obtained by thermal and catalytic cracking of petroleum, shale oil or coal. Generally, these gases comprise methane, ethane, ethylene, propane, propylene, n-butane, isobutane, butenes; and the like. These gas streams can (but do not always) contain other impurities, such as hydrogen sulfide, carbonyl sulfide (COS), mercaptans, organic sulfides, carbon monoxide, carbon dioxide, inert gases ($N_2$, He, Ne, Ar), and the like. Other arsenic compounds may also be present in the fluid stream which is treated by the process of this invention, such as $AsH_3$, $RAsH_2$, $R_2AsH$, $R_3AsO$ (trialkyl arsine oxides), $R_3AsS$ (trialkyl arsine sulfides), and the like; wherein R is an alkyl group, as defined above. It is also possible to have triphenyl arsine, dialkyl phenyl arsines, dialkyl cycloalkyl arsines, and the like present in the feed. Preferably, free oxygen is substantially absent from the feed.

Generally, the total concentration of the trialkyl arsine(s) in the feed (preferably gaseous) is in the range of from about 1 ppb (1 part by weight of trialkyl arsine per billion parts by weight of feed) to about 0.1 weight-%, preferably about 0.5-100 ppm (parts by weight trialkyl arsine per million parts by weight of feed). The concentrations of the other impurities and the exact composition of the feed will widely vary from feedstock to feedstock.

The sorbent materials which are used in the process of this invention comprise at least one manganese oxide, preferably $MnO_2$, and at least one oxide of a Group IB metal (i.e., Cu and/or Ag and/or Au); preferably copper. Any suitable manganese oxide content in the sorbent material can be used, preferably about 30-90-weight-% $MnO_2$, more preferably about 40-80weight-% $MnO_2$. Any suitable Group IB oxide content in the sorbent material can be used, preferably about 3 to about 50 weight-%, more preferably about 10-45° weight-% metal oxide (preferably CuO).

Preferred sorbent materials are Hopcalites, which are commercially available as carbon monoxide oxidants and sorbents (e.g., for gas masks). There are two main formulations of Hopcalite: Hopcalite I is a mixture of about 50% MnOs, about 30% CuO, about 15% $Co_2O_3$, and about 5% $Ag_2O$; Hopcalite II contains about 60% $MnO_2$ and about 40% CuO (David R. Merrill and Charles C. Scalione, J. Am. Chem. Soc., 43, 1921, p. 1982). A Hopcalite II material can also be prepared in a laboratory by dissolving salts of Mn and Cu in water, passing an oxidizing gas (e.g., air) through the solution, adding an alkaline material (e.g., dissolved NaOH) to the oxidized solution so as to coprecipitate oxides/hydroxides of Cu and Mn, separating the coprecipitate from the solution, washing the coprecipitate, drying it, and heating it (preferably at about 150°-250° C. for about 10 minutes to about 10 hours).

The sorbent particles can have any suitable surface area (such as about 10-500 $m^2/g$, as measured by the B.E.T. method employing $N_2$), any suitable shape (spherical, cylindrical, ring-shaped, trilobal etc.) and any suitable size (such as about 1-20 mm diameter for spherical particles).

Any suitable contacting conditions can be employed in the sorption process of this invention. Generally the temperature in the contacting zone is in the range of from about $-20°$ to about 100° C., preferably about 20° to about 50° C. Generally the pressure in the contacting zone is in the range of from about 1 to about 500 atm., preferably about 1 to about 70 atm. Generally the gas hourly space velocity of the gaseous feed in the contacting zone is in the range of from about 1 to about 10,000 volume of feed/volume of sorbent/hour, preferably about 1,000 to about 3,000 volume/volume/hour, measured at about 25° C./1 atm. Generally the contacting is continued until trialkyl arsine breakthrough occurs i.e., when the treated product contains more trialkyl arsines than can be tolerated, such as about 50 ppb.

Treatment of the feed streams, in accordance with the process of this invention, can be carried out in any suitable manner. For example, in a preferred embodiment a bed of the sorbent is placed as a fixed bed in a confined zone, and a fluid stream (preferably a gas) is passed therethrough in either upward or downward flow. Other suitable, yet less preferred methods of treatment can include a fluidized operation in which the feed and the sorbent particles are maintained in a state of turbulence under hindered settling conditions in a confined zone, moving bed operations in which the sorbent passes as a moving bed concurrently to or concurrently with the feed, etc. In a fixed bed operation of a continuous process, the flow of fluid can be rotated between two or more sorbent beds with at least one being in regular operation, the other being in a regeneration mode. Continuous processes are preferred, but it is understood that batch type operations can be employed when desired.

The used sorbent composition (in particular Hopcalite) after it has reached its maximum capacity for trialkyl arsines is capable of being regenerated. Regeneration can be accomplished by a multi-step process comprising an oxidation step employing an oxidizing agent, preferably a free oxygen containing gas (e.g., air), generally at ambient conditions (about 25° C/1 atm.) for a time sufficient (preferably for about 10 minutes to about 10 hours) to at leas: partially oxidize the absorbed arsine(s), e.g., to arsine oxide(s) H (i.e., $R_3AaO$), passing an aqueous liquid, preferably water or an aqueous solution containing hydrogen peroxide (or any other suitable oxidizing agent), through the oxidized bed of sorbent material so as to dissolve any arsenic compound(s), e.g., $R_3AsO$, and thereafter drying the washed sorbent material (preferably at about 50°-120° C. for about 10 minutes to about 10 hours) so as to obtain a regenerated sorbent material (containing less As than the unregenerated used sorbent material) which can be reused in the process of this invention. The above-described regeneration procedure can be repeated (once or more than once).

It is within the scope of this invention to employ a combination of sorbents, such as a first bed of $PbO/Al_2O_3$ or a CuO/ZnO-containing material (described in U.S. Pat. No. 4,593,148) for removal of a major portion of $AsH_3$ or $H_2S$ or both, and at least one subsequent downstream bed containing at least one of the sorbent materials of this invention for absorbing primarily trialkyl arsines. This multi-bed operation can be carried out in one reactor containing a layer of $PbO/Al_2O$. or CuO/ZnO material (or any other known sorbent for $AsH_3$ and $H_2S$) and a downstream layer of a trialkyl arsine sorbent of this invention. Or the multi-bed operation can be carried out using two or more separate sorption reactors: at least one first reactor containing $PbO/Al_2O_3$ or a CuO/ZnO material (or any other known sorbent for $AsH_3$ and $H_2S$) and at least one second reactor containing the trialkyl arsine sorbent of this invention, wherein the feed passes through the first reactor(s) and thereafter through the second reactor(s).

The process of this invention will be further illustrated by the following non-limiting example.

EXAMPLE I

This example illustrates the absorption of an alkyl arsine by several copper-containing sorbent materials.

A nitrogen gas stream was passed through a flask containing liquid-trimethyl arsine (provided by Strem Chemicals, Inc.), which was cooled to about −78° C. by placing the flask in a dry ice/acetone mixture. The exiting gas stream, which consisted essentially of $N_2$ and trimethyl arsine (with no $H_2S$ present), was passed through a glass tube of about 7 mm diameter and about 15 cm length containing about 1 gram of one of the sorbents to be tested. The gas which exited the absorption tube was passed through an aqueous solution of KMnO. and then to a flow meter. The flow rate of the feed gas was about 1800 cc per hour at about 25° C.

When trimethyl arsine breakthrough occurred (i.e., when the sorbent had reached its maximum arsine absorption capacity), the purple color of the KMnO. solution turned brownish. After arsine breakthrough had been detected, the flow of the trimethyl arsine containing gas stream was stopped, and a purge stream of pure nitrogen was passed through the sorbent material for about 1-2 hours so as to purge unabsorbed trimethyl arsine therefrom. The absorption tube containing the sorbent and absorbed trimethyl arsine was weighed. The difference between this weight and the initial weight of the tube with fresh sorbent was the weight of absorbed trimethyl arsine.

The following sorbent materials were tested: (1) a commercial Hopcalite having the approximate chemical formula of $CuO-MnO_2$ (provided by Callery Chemical Company, Pittsburgh, Pa.); comprising about 50 weight-% Mn, about 12 weight-% Cu and 0.3 weight-% Na); (2) CuO/ZnO (substantially as described in Example I of U.S. Pat. No. 4,593,148; provided by BASF Wyandotte Corporation, Parsippany, N.J., under the product designation "R3-12"); (3) Cu(II) chromite ($CuO/Cr_2O_3$; substantially as described in U.S. Pat. No. 4,605,812; provided by United Catalysts, Inc., Louisville, Ky., under the product designation "G-22"). Test results are summarized in Table I.

TABLE I

| Sorbent | Millimoles Trimethyl Arsine Absorbed Per Gram Sorbent[1] |
|---|---|
| Hopcalite | 0.60 |
| CuO/ZnO | 0 |
| Copper (II) Chromite | 0 |

[1] at trialkyl arsine breakthrough

Test results in Table I show that Hopcalite, unexpectedly, absorbed trimethyl arsine while two other Cu oxide-containing materials (which are known $AsH_3$ sorbents) were not effective as trimethyl arsine sorbents.

EXAMPLE II

This example illustrates the regeneration of used Hopcalite which contained absorbed trimethyl arsine.

A stream of air (at room temperature) was passed for one hour over a sample of spent Hopcalite which contained about 4-5 weight-% trimethyl arsine. The thus-treated Hopcalite material was washed twice with distillated water (so as to dissolve oxidized trimethyl arsine), and was then dried at 150° C. for 12-14 hours. The dried regenerated Hopcalite was tested for trimethyl arsine sorption, substantially in accordance with the procedure described in Example I. At trimethyl arsine breakthrough, 0.047 g trimethyl arsine had been absorbed by 1.57 g regenerated Hopcalite. Thus, the maximum absorption capacity of the water-washed and dried regenerated Hopcalite was 0.25 millimoles trimethyl arsine per gram regenerated sorbent.

In a separate test, a sample of another spent Hopcalite which contained about 7 weight-% As (as trimethyl arsine) was treated with flowing air at room temperature for one hour, washed three times with H about 30 weight-% of an aqueous $H_2O_2$ solution, and dried at 100° C. for about 16 hours. The thus-treated Hopcalite was tested for trimethyl arsine sorption, substantially in accordance with the procedure described in Example I. The maximum absorption capacity of this oxidized, $H_2O_2$-treated and dried Hopcalite was 0.61 millimoles trimethyl arsine per gram sorbent. When pure water was substituted for the aqueous $H_2O_2$ solution in the above-described regeneration procedure (employing spent Hopcalite containing about 7 weight-% As), the absorption capacity of the regenerated Hopcalite was only 0.46 millimoles trimethyl arsine per gram regenerated sorbent. Thus, washing with aqueous $H_2O_2$ (after air oxidation) is a preferred mode for regenerating spent, trialkyl arsine containing Hopcalite.

Reasonable variations and modifications, which will be apparent to those skilled in the art, can be made within the scope of the disclosure and the appended claims without departing from the scope of this invention.

That which is claimed is:

1. A process for removing trialkyl arsines from gases comprising the step of contacting a gaseous feed which contains at least one trialkyl arsine with a solid sorbent material comprising a hopcalite; wherein said contacting is carried out at such contacting conditions as to obtain a fluid product having a lower trialkyl arsine content than said feed.

2. A process in accordance with claim 1, wherein said feed is a hydrocarbon-containing gas.

3. A process in accordance with claim 1, wherein said trialkyl arsine has the chemical formula of $R_3As$ with each R being independently selected from the group consisting of alkyl groups containing 1–6 carbon atoms.

4. A process in accordance with claim 3, wherein said alkyl groups contain 1–3 carbon atoms.

5. A process in accordance with claim 1, wherein said at least one trialkyl arsine is selected from the group consisting of trimethyl arsine, triethyl arsine, dimethyl ethyl arsine and diethyl methyl arsine.

6. A process in accordance with claim 1, wherein said feed contains about 1 ppb by weight to about 0.1 weight percent of said at least one trialkyl arsine.

7. A process in accordance with claim 1, wherein said solid sorbent material contains about 50–60 percent by weight $MnO_2$ and about 30–40 percent by weight CuO.

8. A process in accordance with claim 1, wherein said contacting conditions comprise a temperature in the range of from about $-20°$ to 100° C.

9. A process in accordance with claim 1, wherein said feed additionally contains $H_2S$.

10. A process for at least partially removing trialkyl arsines from gases comprising the steps of:
  (1) contacting a gaseous feed which contains at least one trialkyl arsine with a solid sorbent material comprising a hopcalite; under such contacting conditions as to obtain a fluid product having a lower trialkyl arsine content than said feed and to obtain a used solid sorbent material containing that portion of said at least one trialkyl arsine which has been removed from said feed;
  (2) treating said used solid sorbent material with an oxidizing agent;
  (3) passing an aqueous liquid through said solid sorbent material having been contacted with said oxidizing agent, so as to obtain an aqueous solution of at least one arsenic compound and a wet regenerated solid sorbent material containing less arsenic than said used solid sorbent material; and
  (4) drying said wet regenerated solid sorbent material.

11. A process in accordance with claim 10, wherein said feed is a hydrocarbon-containing gas.

12. A process in accordance with claim 10, wherein said trialkyl arsine has the chemical formula of $R_3As$ with each R being independently selected from the group consisting of alkyl groups containing 1–6 carbon atoms per molecule.

13. A process in accordance with claim 12, wherein said at least one trialkyl arsine is selected from the group consisting of trimethyl arsine, triethyl arsine, dimethyl ethyl arsine and diethyl methyl arsine.

14. A process in accordance with claim 10, wherein said oxidizing agent is a free oxygen containing gas.

15. A process in accordance with claim 10, wherein said aqueous liquid is water.

16. A process in accordance with claim 10, wherein said aqueous liquid is an aqueous solution of hydrogen peroxide.

17. A process in accordance with claim 10, wherein the dried regenerated solid sorbent material obtained in step (4) is re-used in step (1).

18. A process in accordance with claim 16, wherein said solid sorbent material contains about 50–60 percent by weight $MnO_2$ and about 30–40 percent by weight CuO.

19. A process in accordance with claim 10, wherein said feed is a gas and said contacting conditions comprise a temperature in the range of from about $-20°$ to 100° C.

20. A process in accordance with claim 10, wherein said feed additionally contains $H_2S$.

* * * * *